Figure 1:
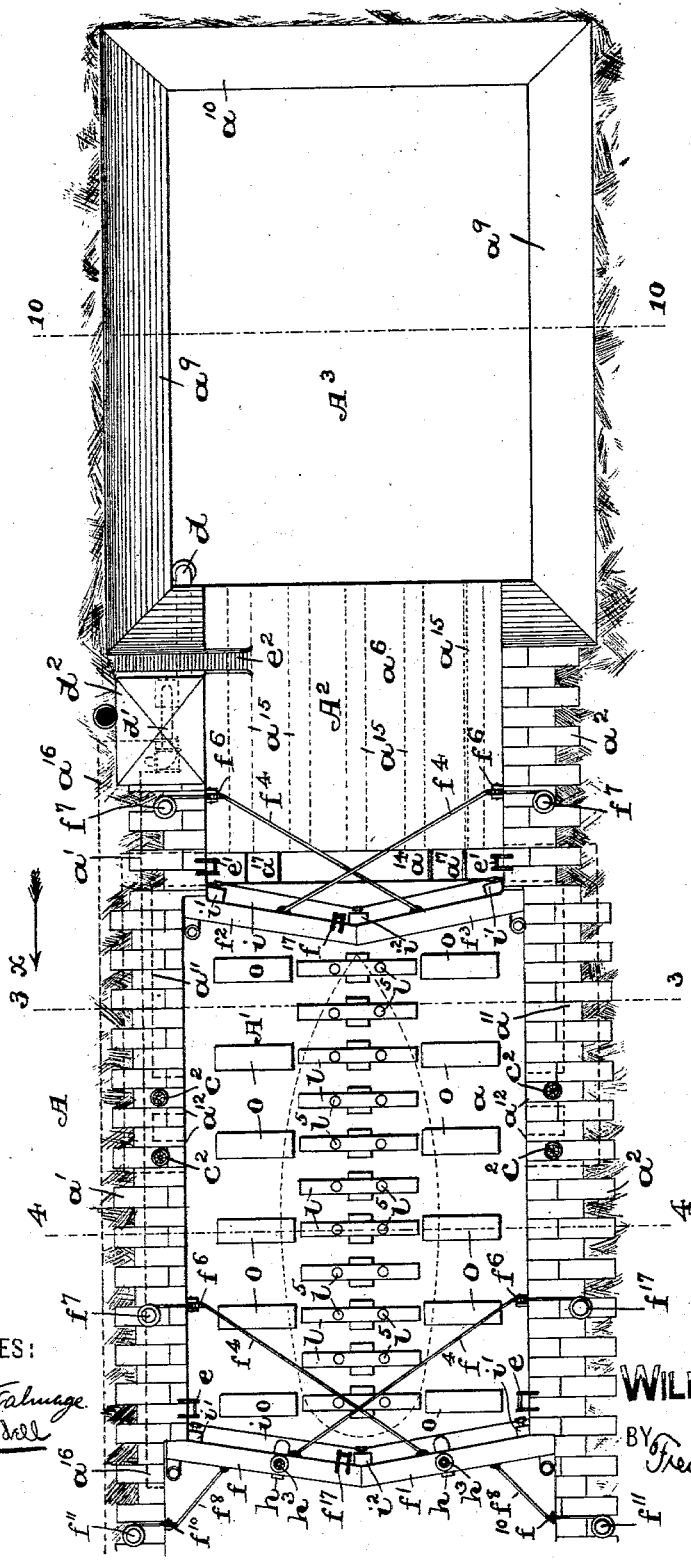

No. 634,554. Patented Oct. 10, 1899.
W. H. GARTZ.
DRY DOCK.
(Application filed May 23, 1899.)

(No Model.) 6 Sheets—Sheet 3.

WITNESSES: INVENTOR:
WILLIAM H. GARTZ.
BY
ATTORNEY

No. 634,554. Patented Oct. 10, 1899.
W. H. GARTZ.
DRY DOCK.
(Application filed May 23, 1899.)

(No Model.) 6 Sheets—Sheet 4.

WITNESSES:
Walter H. Talmage.
Marcy B. Truesdell

INVENTOR
WILLIAM H. GARTZ
BY
Fred L. C. Fraentzel,
ATTORNEY

No. 634,554. Patented Oct. 10, 1899.
W. H. GARTZ.
DRY DOCK.
(Application filed May 23, 1899.)
(No Model.) 6 Sheets—Sheet 5.

WITNESSES:

INVENTOR:
WILLIAM H. GARTZ,
BY
ATTORNEY

No. 634,554. Patented Oct. 10, 1899.
W. H. GARTZ.
DRY DOCK.
(Application filed May 23, 1899.)

(No Model.) 6 Sheets—Sheet 6.

WITNESSES:

INVENTOR:
WILLIAM H. GARTZ
BY
Fred'k C. Fraentzel
ATTORNEY

UNITED STATES PATENT OFFICE.

WILLIAM H. GARTZ, OF BERNARDSVILLE, NEW JERSEY, ASSIGNOR TO AUSTIN WRIGHT AND MARY L. GARTZ, OF SAME PLACE.

DRY-DOCK.

SPECIFICATION forming part of Letters Patent No. 634,554, dated October 10, 1899.

Application filed May 23, 1899. Serial No. 717,912. (No model.)

*To all whom it may concern:*

Be it known that I, WILLIAM H. GARTZ, a citizen of the United States, residing at Bernardsville, in the county of Somerset and State of New Jersey, have invented certain new and useful Improvements in Dry-Docks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in dry-docks; and the invention has for its principal object to provide a novel construction of dock into the inclosure of which water can be readily admitted for the floating of a ship therein and from which the water can be removed by its own gravity to permit the ship's bottom and sides to be cleaned and repaired.

A further object of this invention is to provide a simple means for allowing the water to pass from the basin or inclosure in which the ship is floated into a second basin or inclosure built directly upon the land and preferably surrounded by piling or cribbing to permit the water to soak into the ground.

Another object of this invention is to provide a novel construction of gates and means for opening and closing the same and also a novel construction and arrangement of keel-supports and chocks and in general to provide a dock in which the pressure upon the ship's bottom and the sides can be regulated and maintained the same throughout the entire surface of the hull of the ship to prevent straining the same.

Other objects of this invention not here specifically enumerated will be evident from the following description of my invention.

My present invention therefore consists in the novel construction of dry-dock hereinafter more particularly described; and also my invention consists, furthermore, in such novel arrangements and combinations of the several parts of the dry-dock and the details of the construction thereof, all of which will be fully set forth in the accompanying specification and finally embodied in the clauses of the claim appended thereto.

The invention is clearly illustrated in the accompanying drawings, in which—

Figure 2:
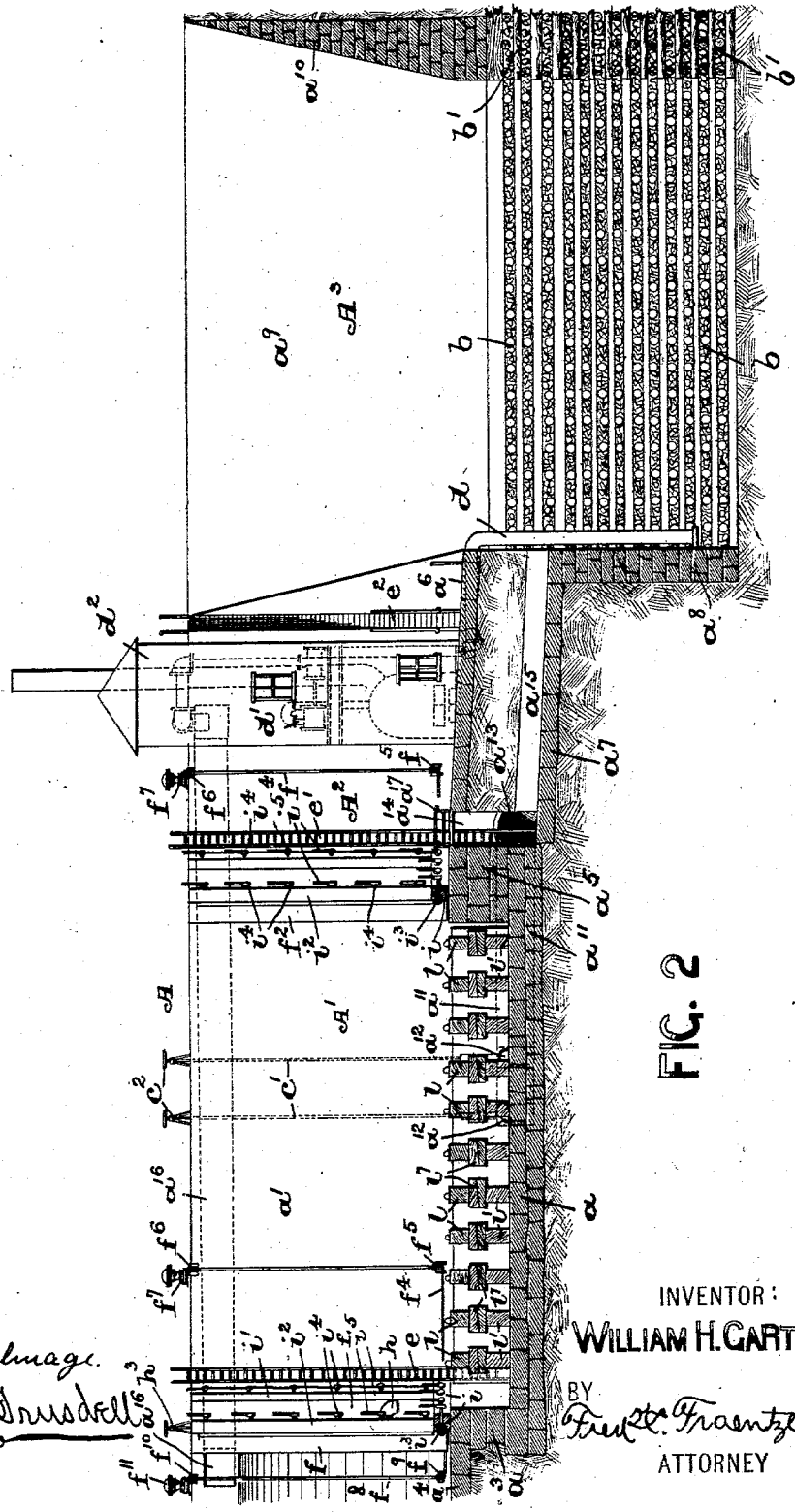
Figure 3:
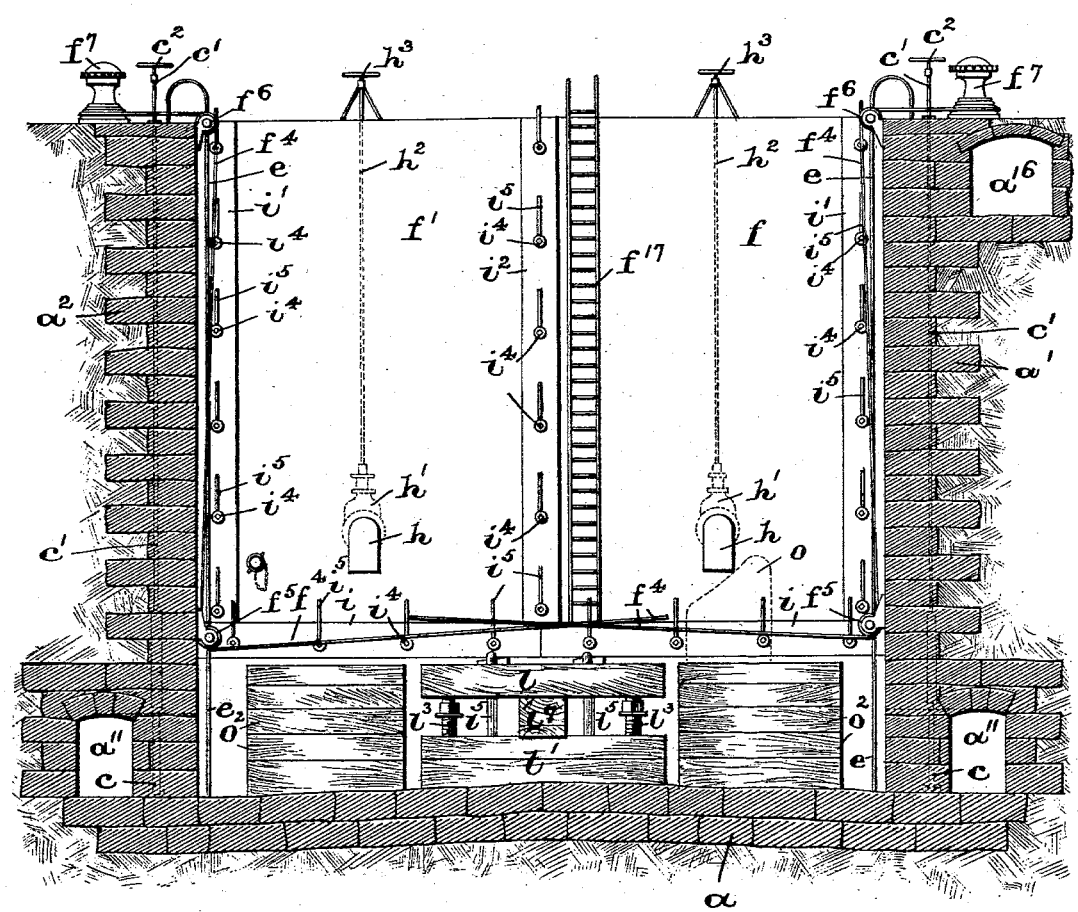
Figure 4:
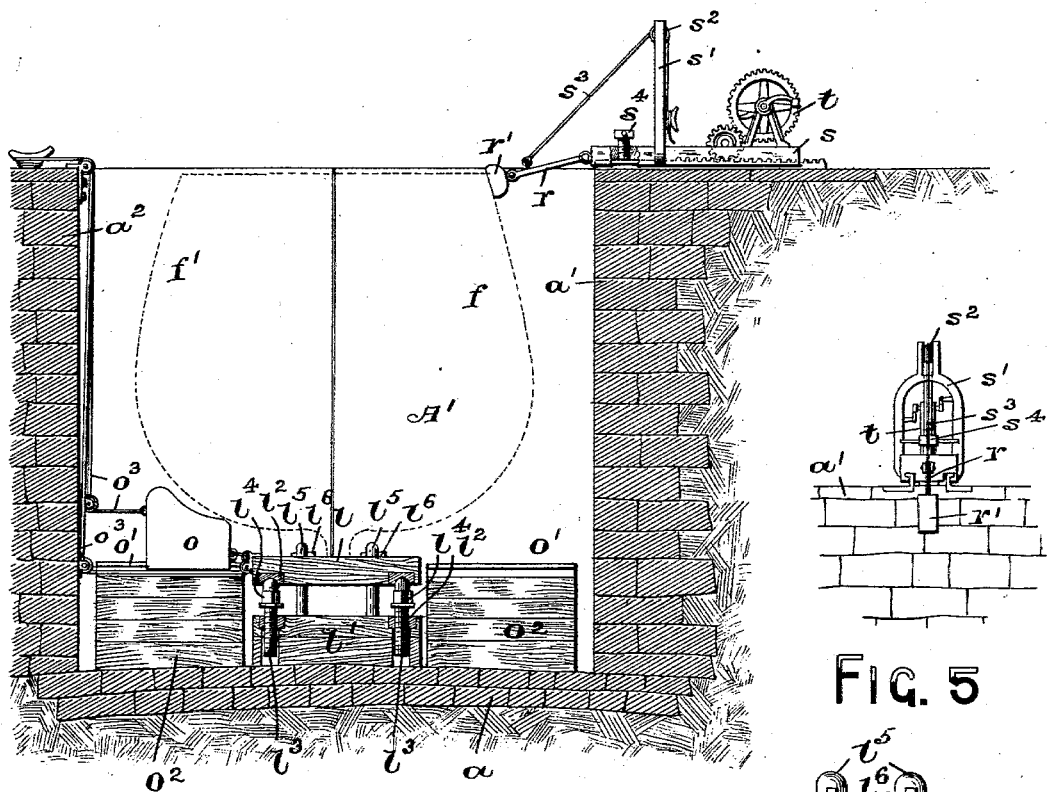
Figure 5:
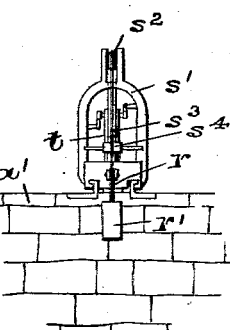
Figure 6:
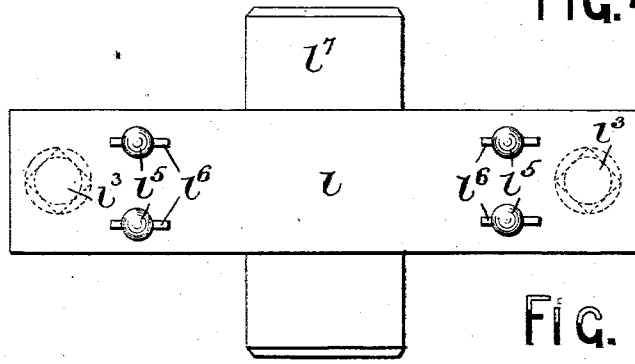
Figure 7:
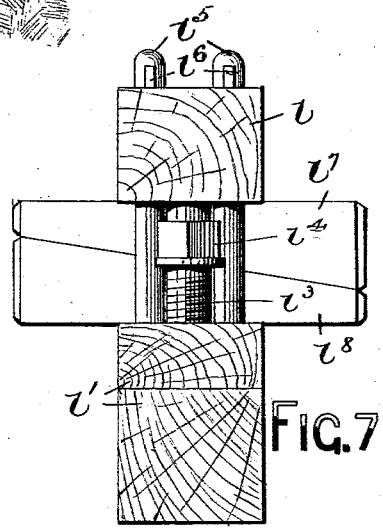
Figure 8:
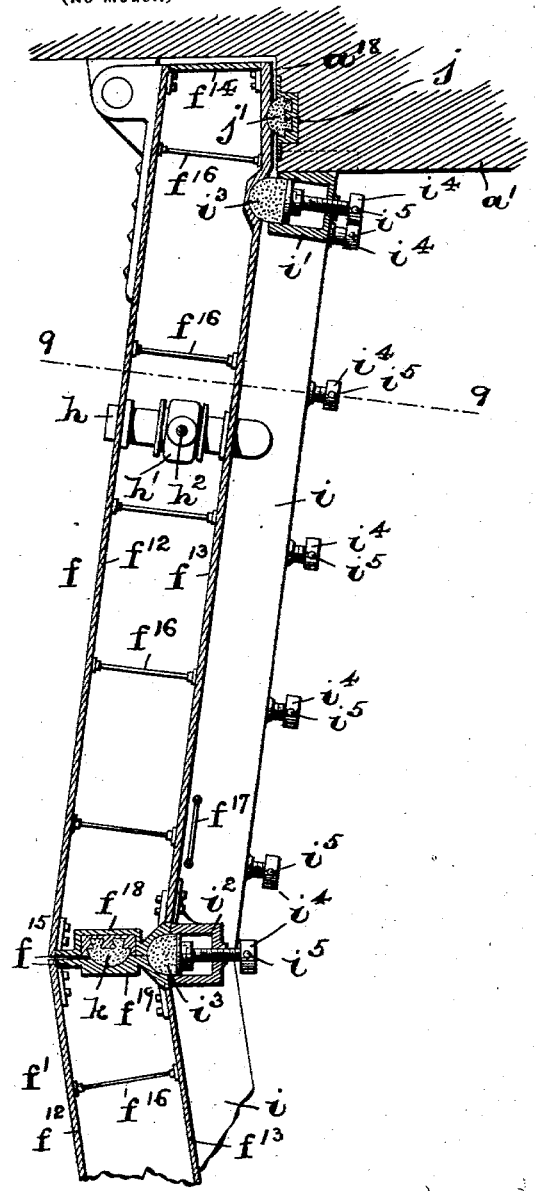
Figure 9:
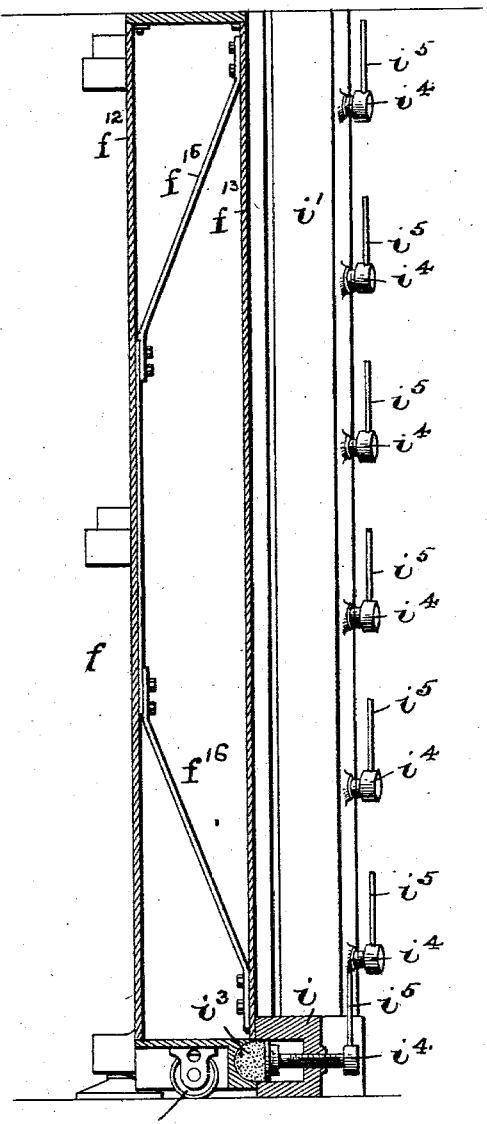
Figure 10:
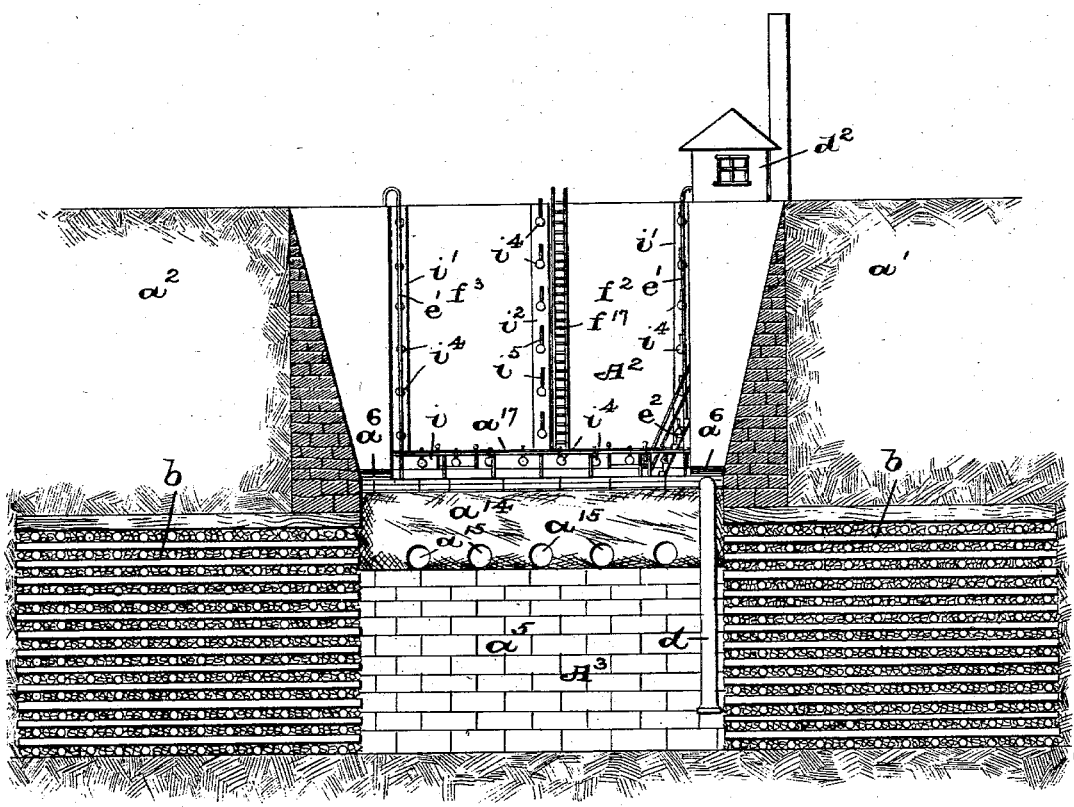

Figure 1 is a plan view of a dry-dock embodying the leading features of this invention, and Fig. 2 is a longitudinal vertical section of the dock. Fig. 3 is a vertical cross-section of the dock, said section being taken on line 3 3 in Fig. 1, looking in the direction of arrow X, and said section being made on an enlarged scale. Fig. 4 is a vertical cross-section of the dock, taken on line 4 4 in said Fig. 1, said view illustrating more particularly my novel arrangement of keel-supports and sliding chocks, means for operating the same, and an arrangement of side supports and mechanism for bringing said side supports closer to—that is, in holding engagement with—the side of the vessel or farther away from the same; and Fig. 5 is an end view of said mechanism for operating the side supports. Fig. 6 is a top view of one of the keel-supports, and Fig. 7 is an end view of the same. Fig. 8 is a horizontal section of a pair of gates employed in connection with my novel construction of dry-dock, and Fig. 9 is a vertical section of the same. Fig. 10 is a vertical cross-section taken on line 10 10 in Fig. 1.

Similar letters of reference are employed in all of the said above-described views.

In said drawings, A indicates my novel construction of a dry-dock, which comprises three compartments or chambers $A'$, $A^2$, and $A^3$, substantially as illustrated in Figs. 1 and 2. The main chamber $A'$, in which the ship is to be docked, and the chamber $A^2$ are built of masonry, the chamber $A'$ comprising a bottom $a$ and the side walls $a'$ and $a^2$, said walls $a'$ and $a^2$ also forming the side walls of the chamber $A^2$. Said walls are made of sufficient strength to resist a pressure of water equal to their height, the several walls and the bottom of said chambers $A'$ and $A^2$ being preferably laid in concrete and clay-puddling. At the front or entrance to the chamber $A$ the base $a$ is preferably built up, as at $a^3$, and mason-work $a^4$ is built out therefrom to extend some distance beneath the surface of the water in front of the outer dock-gate, substantially as represented in said Fig. 2. Furthermore, the chambers A' and A² are separated at the bottom by a cross-wall $a^5$, of stone and masonwork. The said chamber A² consists, essentially, of the two side walls $a'$ and $a^2$, which are a continuation of the walls of the chamber A', and an inclined bottom $a^6$, preferably made of stone. Said bottom $a^6$ is laid upon a bed of concrete and clay-puddling or other suitable material, which is preferably placed upon a subbottom $a^7$, of stone, from which extends a vertical wall $a^8$ down into the earth, said wall $a^8$ forming a part of the chamber A³, forming a water-receiving basin into which the water from the dock-chamber A' can be admitted, substantially as and for the purposes to be hereinafter fully set forth. The said chamber A³ is built directly in the earth of the shore, forming a suitable caisson, comprising the wall $a^8$, above mentioned, and the sides $b$ and back wall $b'$, which are made up of the usual construction of piling or cribbing filled in with broken stone to enable the water to more readily soak into the ground. The said chamber A³ is surrounded on its sides and back and directly above the said sides $b$ and back wall $b'$ by the stone walls $a^9$ on said sides $b$ and the stone wall $a^{10}$ upon the back wall $b'$, said walls being preferably made tapering, substantially as represented in Figs. 1, 2, and 10.

As indicated in dotted outline in Fig. 1 and as more especially represented in Figs. 1, 2, 3, and 10, I have provided the walls $a'$ and $a^2$ with a culvert $a^{11}$, preferably arranged partially below the level $a$ of the chamber A', and being in communication with said chamber through one or more openings $a^{12}$, which can be opened and closed by means of suitably-constructed gates $c$, as indicated more especially in dotted outline in said Fig. 3, said gates being raised or lowered by the rods $c'$, when turned by means of the hand-wheels $c^2$, arranged in suitable frames on the upper surfaces of said side walls $a'$ and $a^2$. Said culverts $a^{11}$ communicate by means of suitable outlets $a^{13}$ with an open space $a^{14}$, arranged between the chambers A' and A², which forms a raceway to permit the water to flow into drains or culverts $a^{15}$, arranged beneath the upper bottom of the chamber A², and into the drain-chamber or caisson A³, as will be clearly understood from an inspection of Fig. 2.

As an extra precaution to more readily remove the water from the chamber A³ a pipe $d$, connected with a pumping-engine $d'$ in a suitably-arranged pump-house in the chamber A² or any other desirable place, may be employed, said pumping-engine being capable of forcing the water from said chamber or well A³ into a discharge-culvert $a^{16}$, substantially as illustrated in Figs. 1, 2, and 3.

As illustrated more particularly in Fig. 1, ladders or stairways $e$, $e'$, and $e^2$ may be employed, which can be arranged substantially as indicated to permit the workmen to get down into the respective chambers for repairs and cleaning purposes, and the said open space $a^{14}$ is preferably covered by means of a bridge or bridges $a^{17}$ to permit the workmen to cross from one chamber into the other. Arranged upon the said built-up part $a^3$ of the chamber A' are a pair of hinged dock-gates $f$ and $f'$, preferably of the construction illustrated more especially in Figs. 8 and 9 and the special construction of which will be described in detail hereinafter, while upon the cross-wall $a^5$, between the chambers A' and A², I have arranged a similar pair of hinged dock-gates $f^2$ and $f^3$, substantially as illustrated in Fig. 1. Said gates $f$ and $f'$ and $f^2$ and $f^3$ have attached thereto at the bottom, so as to be out of harm's way, suitable flexible connections $f^4$, which pass over pulley-wheels or rollers $f^5$ and $f^6$, secured in frames attached to the side walls $a'$ and $a^2$ and arranged around the bodies of capstans $f^7$, which when turned will cause said gates to become tightly closed. The external gates $f$ and $f'$ have also attached thereto suitable flexible connections $f^8$, passing over rollers or pulley-wheels $f^9$ and $f^{10}$ and around the bodies of capstans $f^{11}$, which can be operated to open said gates $f$ and $f'$ against the pressure of the body of water on the exterior surfaces of said gates. Said gates $f$ and $f'$ and the gates $f^2$ and $f^3$ are preferably constructed of the plates $f^{12}$ and $f^{13}$, which are connected by the end plates $f^{14}$ and $f^{15}$ and suitably-arranged stay-bolts $f^{16}$ to produce stability and at the same time greatly reduce the weight of each gate. Each gate may be provided at the bottom with suitably-arranged wheels or rollers $g$, whereby the gates are more readily turned upon their hinges, and $h$ are suitably-constructed water-inlets in the gates $f$ and $f'$, provided with valves $h'$, having valve-stems $h^2$, which are opened and closed by means of the hand-wheels $h^3$ on the upper edges of said gates. One or both of said gates may also be provided with a ladder $f^{17}$, substantially as illustrated in Fig. 3.

Each gate $f$ and $f^2$ may have a suitably-constructed recess, as $f^{18}$, in which is secured a packing $k$, which fits into a recess $f^{19}$ in the edge of the gates $f'$ and $f^3$, substantially as illustrated, and $i$, $i'$, and $i^2$ are frame-pieces which are connected with said gates and are provided with packing-pieces $i^3$, which can be tightly forced into recesses in the gates by means of screws $i^4$ and the operating-handles $i^5$, substantially as represented in the drawings. Thus it will be evident that after a vessel has been floated into the chamber A' and has been arranged on the keel-supports $l$ therein, the exterior gates $f$ and $f'$ closed, and the water in said chamber A' has been permitted to flow into the chamber A³, the said gates can be tightly sealed against leakage from the water on the outside.

As illustrated in Fig. 8, a packing $j$, arranged in a frame $j'$ in the edges $a^{18}$ of the side walls $a'$ and $a^2$, may also be employed to make a water-tight fit for the gates at their hinged edges with said side walls, as will be clearly understood.

My novel construction of dry-dock A is used in the following manner: Suppose the gates $f^2$ and $f^3$ to have been closed and also the gate-valves $c$ to have been closed and the gates $f$ and $f'$ to be open, whereby the water in the chamber A' is on the same level with that on the outside of the dock to enable the floating of a vessel into said chamber A'. The exterior gates $f$ and $f'$ are now closed and the gate-valves $c$ opened. The water in said chamber A' immediately passes by its own gravity into the chamber or well A³, and the keel of the vessel will settle in position upon the keel-supports $l$. During the passage of the water from the chamber A' into chamber A³ certain chocks $o$, which are slidably arranged on ways or tracks $o'$ on the supports $o^2$, can be brought by means of flexible connections $o^3$ against the sides of the hull of the vessel, so as to support the latter upon the keel-supports $l$, substantially as indicated in Fig. 4. After the water has been removed from the chamber A' the gates $f$ and $f'$ are made water-tight and the gates $f^2$ and $f^3$ can be opened to permit the use of the chamber A² by the workmen. As an extra precaution side supports $r$ may also be employed, as indicated in said Fig. 4, said supports being pivoted to a carriage $s$, slidably arranged in ways on the upper surfaces of the walls $a'$ and $a^2$, as indicated in Figs. 4 and 5, and operated by means of a suitable gear mechanism $t$, substantially as illustrated. Each support $r$ has pivotally connected therewith a block $r'$ to prevent marring or other damage to the sides of the vessel. The frame of said carriage $s$ may be provided with an upright or frame $s'$ and a grooved wheel $s^2$, over which can be passed a flexible connection $s^3$, which is attached to the support $r$, to enable the raising and lowering of the latter, as will be clearly evident, a screw $s^4$ or other means being employed to lock said carriage $s$ in its adjusted position.

The keel-supports $l$ above mentioned consist, essentially, of the lower blocks $l'$, provided with nuts $l^2$ and adjusting-screws $l^3$ therein, said screws having certain angular parts $l^4$, by means of which they may be turned to raise or lower the main blocks $l$, as will be clearly understood from an inspection of Figs. 4 and 7. The blocks $l'$ have an arrangement of vertical posts $l^5$, which extend through holes in the main blocks $l$ and serve as guides for the proper adjustment of said blocks $l$ when the screws $l^3$ are turned, certain keys $l^6$, connected with said posts $l^5$, being employed to limit the upward movement of said blocks $l$. When the several keel-supports have been properly adjusted, wedges $l^7$ and $l^8$ can be placed between each pair of blocks $l$ and $l'$ and driven home to remove the strain from the screws $l^3$.

After the ship's bottom and sides have been repaired, cleaned, and painted and is again ready for sea the gates $f^2$ and $f^3$ are again closed. The valves $c$ are also closed, and water is admitted into the chamber A' through the inlets $h$ in the gates $f$ and $f'$ by opening the valves $h'$. As soon as the chamber A is filled the valves $h'$ are again closed and the gates $f$ and $f'$ opened to permit the withdrawal of the vessel from the chamber A, which is then ready for occupancy by another vessel.

The many advantages derived from my invention will be evident from the above description, and it will be seen that I have devised an operative and very simple construction of dry-dock.

I am fully aware that many changes may be made in the several arrangements as well as in the details of the construction of the mechanism and parts of the same and in the arrangement and construction of the chambers comprising my novel construction of dry-dock. Hence I do not limit my invention to the exact arrangements and combinations of the several mechanism herein set forth nor to the exact details of the construction of the parts thereof. Furthermore, I do not confine myself to the exact arrangements and constructions of the several chambers A', A², and A³ of the dry-dock.

Having thus described my invention, what I claim is—

1. In a dry-dock, the combination with compartments or chambers, in which a vessel is to be docked, of a series of other compartments or chambers, a means of closure between said chambers, and means at the forward end of the docking-chamber for shutting the same off from the outside supply of water, and a means of communication between said docking-chamber and said series of other compartments or chambers for conducting the water in the docking-chamber into said other chambers when the vessel is docked, substantially as and for the purposes set forth.

2. In a dry-dock, the combination with a docking compartment or chamber, having gates, and comprising side walls and a bottom of masonry, of a compartment or chamber connected therewith, forming a caisson or well, having an open bottom, and a means of communication between said docking-chamber and said caisson or well for conducting the water from said docking-chamber into said caisson or well, substantially as and for the purposes set forth.

3. In a dry-dock, the combination with a docking compartment or chamber, having gates, and comprising side walls and a bottom of masonry, of a compartment or chamber connected therewith, forming a caisson or well, having an open bottom, culverts or ducts in the side walls of said docking-chamber and in communication with said caisson or well, for conducting the water from said docking-chamber into said caisson or well, and mechanism in said culverts or ducts for shutting them off from said docking-chamber, substantially as and for the purposes set forth.

4. In a dry-dock the combination with a docking compartment or chamber, having gates, and comprising side walls and a bottom of masonry, of a compartment or chamber connected therewith, forming a caisson or well, having an open bottom, culverts or ducts in the side walls of said docking-chamber and in communication with said caisson or well, for conducting the water from said docking-chamber into said caisson or well, a valve mechanism in each culvert, a rod connected with each valve mechanism extending to the top of said side walls of the docking-chamber, and means on said rods for operating the same, substantially as and for the purposes set forth.

5. In a dry-dock, the combination with a docking compartment or chamber having gates, and comprising side walls and a bottom of masonry, of a compartment or chamber forming a caisson or well having an open bottom, a chamber intermediately arranged between said docking-compartment and said caisson or well, and constructed of masonry, culverts or ducts in the side walls of said docking-chamber, and drains in the bottom of said intermediately-placed chamber, with which the culverts or ducts are connected for conducting the water from said docking-chamber into said caisson or well, substantially as and for the purposes set forth.

6. In a dry-dock, the combination with a docking compartment or chamber, having gates, and comprising side walls and a bottom of masonry, of a compartment or chamber forming a caisson or well having an open bottom, a chamber intermediately arranged between said docking-compartment and said caisson or well, and constructed of masonry, culverts or ducts in the side walls of said docking-chamber, and drains in the bottom of said intermediately-placed chamber, with which the culverts or ducts are connected for conducting the water from said docking-chamber into said caisson or well, and mechanism in said culverts or ducts for shutting them off from said docking-chamber, substantially as and for the purposes set forth.

7. In a dry-dock, the combination with a docking compartment or chamber, having gates, and comprising side walls and a bottom of masonry, of a compartment or chamber forming a caisson or well having an open bottom, a chamber intermediately arranged between said docking-compartment and said caisson or well, and constructed of masonry, culverts or ducts in the side walls of said docking-chamber, and drains in the bottom of said intermediately-placed chamber, with which the culverts or ducts are connected for conducting the water from said docking-chamber into said caisson or well, and mechanism in said culverts or ducts for shutting them off from said docking-chamber, consisting, essentially, of a valve in each culvert or duct, a rod connected with each valve, extending to the top of said side walls of the docking-chamber, and means on said rods for operating the same, substantially as and for the purposes set forth.

8. The herein-described dry-dock, comprising a docking-chamber, A', having a bottom $a$, side walls $a'$ and $a^2$, and cross-walls $a^3$ and $a^5$, all of masonry, gates upon said cross-walls, a chamber $A^2$ formed with an opening $a^{14}$, and a compartment $A^3$ having an open bottom, culverts or ducts $a^{11}$ in said side walls $a'$ and $a^2$ having openings connected with said chamber A', and provided with outlets terminating in the opening $a^{14}$ in said chamber $A^2$, and drains $a^{15}$ connecting said opening $a^{14}$ with said compartment $A^3$, substantially as and for the purposes set forth.

9. The herein-described dry-dock, comprising a docking-chamber A' having a bottom $a$, side walls $a'$ and $a^2$, and cross-walls $a^3$ and $a^5$, all of masonry, gates upon said cross-walls, a chamber $A^2$ formed with an opening $a^{14}$, and a compartment $A^3$ having an open bottom, culverts or ducts $a^{11}$ in said side walls $a'$ and $a^2$ having openings connected with said chamber A', and provided with outlets terminating in the opening $a^{14}$ in said chamber $A^2$, and drains $a^{15}$ connecting said opening $a^{14}$ with said compartment $A^3$, and mechanism in said culverts or ducts $a^{11}$ for shutting them off from said chamber A', substantially as and for the purposes set forth.

10. The herein-described dry-dock, comprising a docking-chamber A' having a bottom $a$, side walls $a'$ and $a^2$, and cross-walls $a^3$ and $a^5$, all of masonry, gates upon said cross-walls, a chamber $A^2$ formed with an opening $a^{14}$, and a compartment $A^3$ having an open bottom, culverts or ducts $a^{11}$ in said side walls $a'$ and $a^2$ having openings connected with said chamber A', and provided with outlets terminating in the opening $a^{14}$ in said chamber $A^2$, and drains $a^{15}$ connecting said opening $a^{14}$ with said compartment $A^3$, and mechanism in said culverts or ducts $a^{11}$ for shutting them off from said chamber A', consisting, essentially, of a valve in each culvert or duct, a rod connected with each valve, extending to the top of said side walls, and means on said rods for operating the same, substantially as and for the purposes set forth.

11. In a dry-dock, the combination, with a docking compartment or chamber, having gates at its forward end and gates at its rear end, said docking compartment or chamber comprising side walls and a bottom of masonry, of a compartment or chamber connected therewith, forming a caisson or well, a means of communication between said docking-chamber and said caisson or well for conducting the water from said docking-chamber into said caisson or well, and means in said forwardly-arranged gates for flooding said docking-chamber, substantially as and for the purposes set forth.

12. In a dry-dock, the combination, with a docking compartment or chamber, having gates at its forward end and gates at its rear end, said docking compartment or chamber comprising side walls and a bottom of masonry, of a compartment or chamber connected therewith, forming a caisson or well, a means of communication between said docking-chamber and said caisson or well for conducting the water from said docking-chamber into said caisson or well, and means in said forwardly-arranged gates for flooding said docking-chamber, consisting, of a water-inlet pipe $h$, and a valve in said pipe, substantially as and for the purposes set forth.

13. In a dry-dock, the combination, with the docking-chamber thereof, of a gate having recessed portions or channels, a packing therein, and means for forcing said packing tightly into said recessed portions or channels, consisting, essentially, of frame-pieces arranged above and over said packing, and screws in said frame-pieces adapted to be screwed down upon said packing, substantially as and for the purposes set forth.

14. In a dry-dock, the combination, with the docking-chamber thereof, of a gate, consisting, essentially, of plates $f^{12}$ and $f^{13}$, and end plates $f^{14}$ and $f^{15}$, and connecting stay-bolts, recessed portions or channels in said plates, a packing therein, and means for forcing said packing tightly into said recessed portions or channels, substantially as and for the purposes set forth.

15. In a dry-dock, the combination, with the docking-chamber thereof, of a gate, consisting, essentially, of plates $f^{12}$ and $f^{13}$, and end plates $f^{14}$ and $f^{15}$, and connecting stay-bolts, recessed portions or channels in said plates, a packing therein, and means for forcing said packing tightly into said recessed portions or channels, consisting of frame-pieces arranged above and over said packing, and screws in said frame-pieces, adapted to be screwed down upon said packing, substantially as and for the purposes set forth.

16. In a dry-dock, the combination, with the docking-chamber thereof, of a keel-support, consisting, essentially, of a main support or block $l$, a lower block or blocks, vertical screws connected therewith, and means for turning said screws, said screws being operatively connected with said main support $l$, and guide-posts, $l^5$, all arranged, substantially as and for the purposes set forth.

17. In a dry-dock, the combination, with the docking-chamber thereof, of a keel-support, consisting, essentially, of a main support or block $l$, a lower block or blocks, vertical screws connected therewith, and means for turning said screws, said screws being operatively connected with said main support $l$, and guide-posts $l^5$, all arranged as set forth, supports $o^2$ in said chamber, tracks $o'$ on said supports and chocks slidably arranged on said tracks, substantially as and for the purposes set forth.

18. In a dry-dock, the combination, with a docking compartment or chamber, having gates at its forward end and gates at its rear end, said docking compartment or chamber comprising side walls and a bottom of masonry, of a compartment or chamber connected therewith, forming a caisson or well, having an open bottom, culverts or ducts in the side walls of said docking-chamber and in communication with said caisson or well, for conducting the water from said docking-chamber into said caisson or well, a valve mechanism in each culvert, a rod connected with each valve mechanism extending to the top of said side walls of the docking-chamber, and means on said rods for operating the same, and means in said forwardly-arranged gates for flooding said docking-chamber, substantially as and for the purposes set forth.

19. In a dry-dock, the combination, with a docking compartment or chamber, having gates at its forward end and gates at its rear end, said docking compartment or chamber comprising side walls and a bottom of masonry, of a compartment or chamber connected therewith, forming a caisson or well, having an open bottom, culverts or ducts in the side walls of said docking-chamber and in communication with said caisson or well, for conducting the water from said docking-chamber into said caisson or well, a valve mechanism in each culvert, a rod connected with each valve mechanism extending to the top of said side walls of the docking-chamber, and means on said rods for operating the same, and means in said forwardly-arranged gates for flooding said docking-chamber, consisting, of a water-inlet pipe $h$, and a valve in said pipe, substantially as and for the purposes set forth.

In testimony that I claim the invention set forth above I have hereunto set my hand this 11th day of May, 1899.

WILLIAM H. GARTZ.

Witnesses:
 FREDK. C. FRAENTZEL,
 WALTER H. TALMAGE.